(12) United States Patent
Pritchard et al.

(10) Patent No.: US 8,601,892 B2
(45) Date of Patent: Dec. 10, 2013

(54) DCT TRANSMISSION UTILIZING A TWO AXIS CHAIN

(75) Inventors: Larry A. Pritchard, Macomb, MI (US); Matthew A. Rahaim, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 367 days.

(21) Appl. No.: 12/928,499

(22) Filed: Dec. 13, 2010

(65) Prior Publication Data

US 2011/0167955 A1 Jul. 14, 2011

Related U.S. Application Data

(60) Provisional application No. 61/335,791, filed on Jan. 12, 2010.

(51) Int. Cl.
*F16H 3/08* (2006.01)

(52) U.S. Cl.
USPC ............. 74/331; 74/25; 74/29; 74/336 B

(58) Field of Classification Search
USPC ............. 74/331, 336 B, 325, 329
See application file for complete search history.

(56) References Cited

U.S. PATENT DOCUMENTS

| | | | |
|---|---|---|---|
| 5,711,409 A | 1/1998 | Murata | |
| 6,314,928 B1 | 11/2001 | Baraszu et al. | |
| 6,318,318 B1 | 11/2001 | Jahr | |
| 6,532,920 B1 | 3/2003 | Sweetnam et al. | |
| 6,553,962 B1 | 4/2003 | Russ et al. | |
| 6,631,700 B2 | 10/2003 | Diggs et al. | |
| 6,729,284 B2 | 5/2004 | Lunsford | |
| 6,782,856 B2 | 8/2004 | Aimone | |
| 6,871,620 B2 | 3/2005 | Aimone | |
| 6,887,184 B2 | 5/2005 | Buchanan et al. | |
| 6,909,955 B2 | 6/2005 | Vukovich et al. | |
| 6,966,989 B2 | 11/2005 | Hojsgaard et al. | |
| 2005/0211007 A1 | 9/2005 | Suzuki et al. | |
| 2006/0101933 A1 | 5/2006 | Koenig et al. | |
| 2006/0207655 A1 | 9/2006 | Xiang et al. | |
| 2006/0219034 A1 | 10/2006 | Hori et al. | |
| 2007/0068297 A1 | 3/2007 | Hori et al. | |
| 2007/0144284 A1 | 6/2007 | Mitsubori et al. | |
| 2007/0266810 A1* | 11/2007 | Forsyth ........................... | 74/331 |
| 2008/0064554 A1 | 3/2008 | Tsukada et al. | |
| 2008/0087119 A1 | 4/2008 | Shiozaki | |
| 2008/0098838 A1* | 5/2008 | Seo ................................. | 74/340 |
| 2008/0163710 A1* | 7/2008 | Antonov ........................ | 74/331 |
| 2009/0137358 A1* | 5/2009 | Braford ......................... | 475/271 |
| 2010/0037718 A1* | 2/2010 | Gumpoltsberger ............. | 74/331 |
| 2010/0269613 A1* | 10/2010 | Kang ............................. | 74/331 |
| 2010/0331132 A1 | 12/2010 | Pritchard et al. | |

* cited by examiner

*Primary Examiner* — Troy Chambers
*Assistant Examiner* — Emily Cheng
(74) *Attorney, Agent, or Firm* — Warn Partners, P.C.

(57) ABSTRACT

A dual clutch transmission for a vehicle is provided. The transmission includes a first input shaft driven by a first clutch and a second input shaft driven by a second clutch. An output shaft or shafts are driven by the input shafts having selective mesh torsional force transferring gear contact therewith. A differential input gear is driven by the output shaft or shafts. At least one of the input shafts has at least one input gear that torsionally engages with the output shaft via an idler shaft having an idler input shaft torsionally connected on the idler shaft with an idler shaft output gear through a one-way clutch and wherein the idler shaft output gear is meshed with another gear on the one input shaft.

1 Claim, 6 Drawing Sheets

DCT TRANSMISSION UTILIZING A TWO AXIS CHAIN

FIELD OF THE INVENTION

The present invention relates to dual clutch transmissions for automotive vehicles.

BACKGROUND OF THE INVENTION

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first and oldest type is the manually operated transmission. These transmissions include a foot-operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever, and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However; when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. A type of combination type transmission is commonly referred to as a dual clutch transmission.

Examples of dual clutch transmissions and control methods can be found by a review of U.S. Patents and Patent Application Publications U.S. Pat. Nos. 5,711,409; 6,966, 989; 6,887,184; 6,909,955; 2006/0101933A1; and 2006/0207655A1 commonly assigned.

Dual clutch transmissions can be utilized in front wheel drive engines. When utilizing a dual clutch transmission in a transverse mounted engine, it is desirable to make the width of the transmission as short as possible. An example of a dual clutch transmission for a front wheel drive vehicle is shown in Patent Application 2008/004288. It is desirable to provide a dual clutch transmission suitable for a transverse mounted front wheel drive vehicle or other vehicle which is axially shorter than that described in Patent Application 2008/004288.

SUMMARY OF THE INVENTION

To meet the above noted and other desires, a revelation of the present invention is brought forth.

In a preferred embodiment, the present invention brings forth a vehicle dual clutch transmission which includes a dual clutch transmission for a vehicle. The transmission includes a first input shaft driven by a first clutch and a second input shaft driven by a second clutch. An output shaft or shafts are driven by the input shafts having selective meshed torsional force transferring gear contact therewith. A differential input gear is driven by the output shaft or shafts. At least one of the input shafts has at least one input gear that torsionally engages with the output shaft via an idler shaft having an idler shaft input gear torsionally connected on the idler shaft with an idler shaft output gear through a one-way clutch and wherein, the idler shaft output gear is meshed with another gear on the one input shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
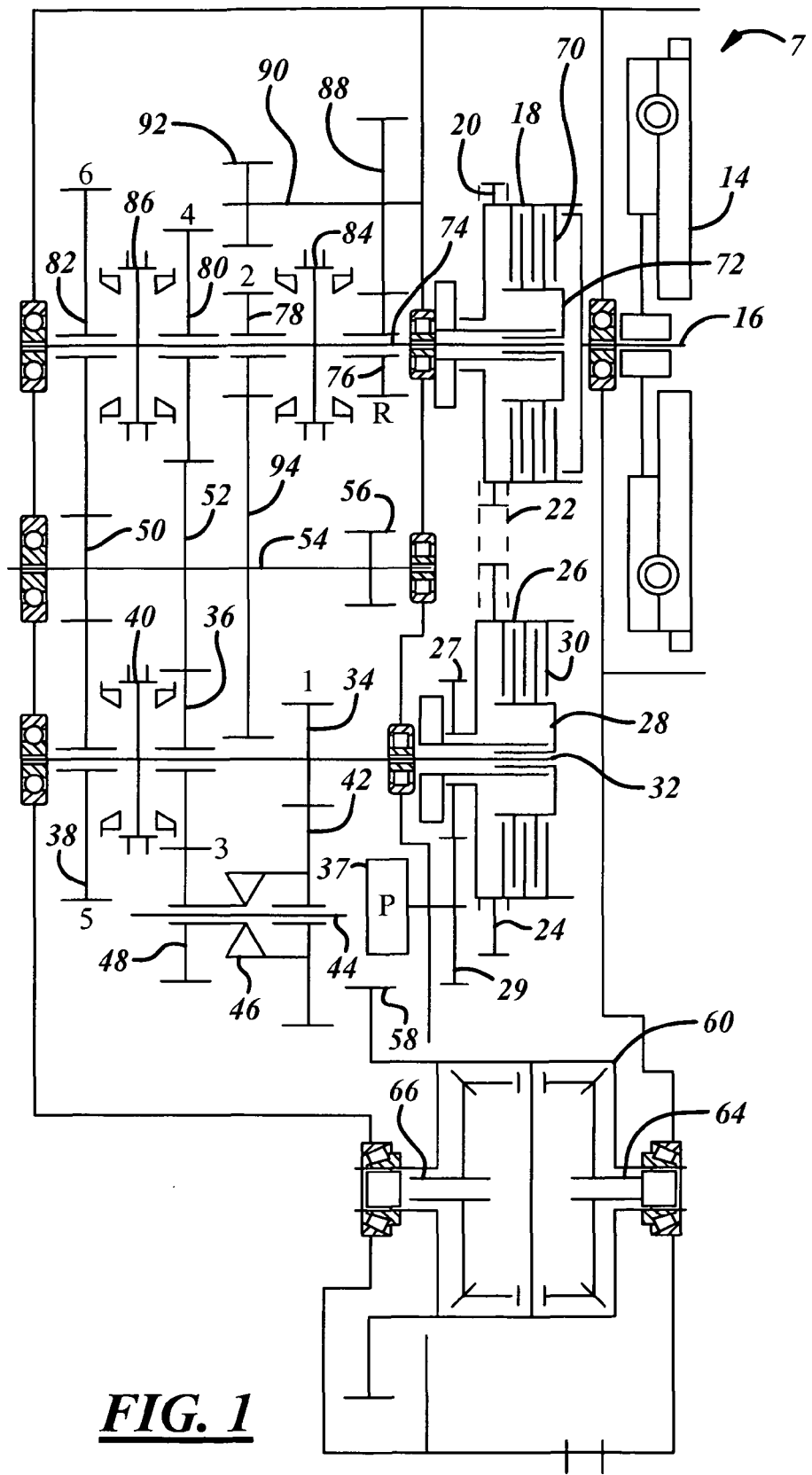
FIG. 1 is a schematic view of a six speed version of a dual clutch transmission according to the present invention.
Figure 2:
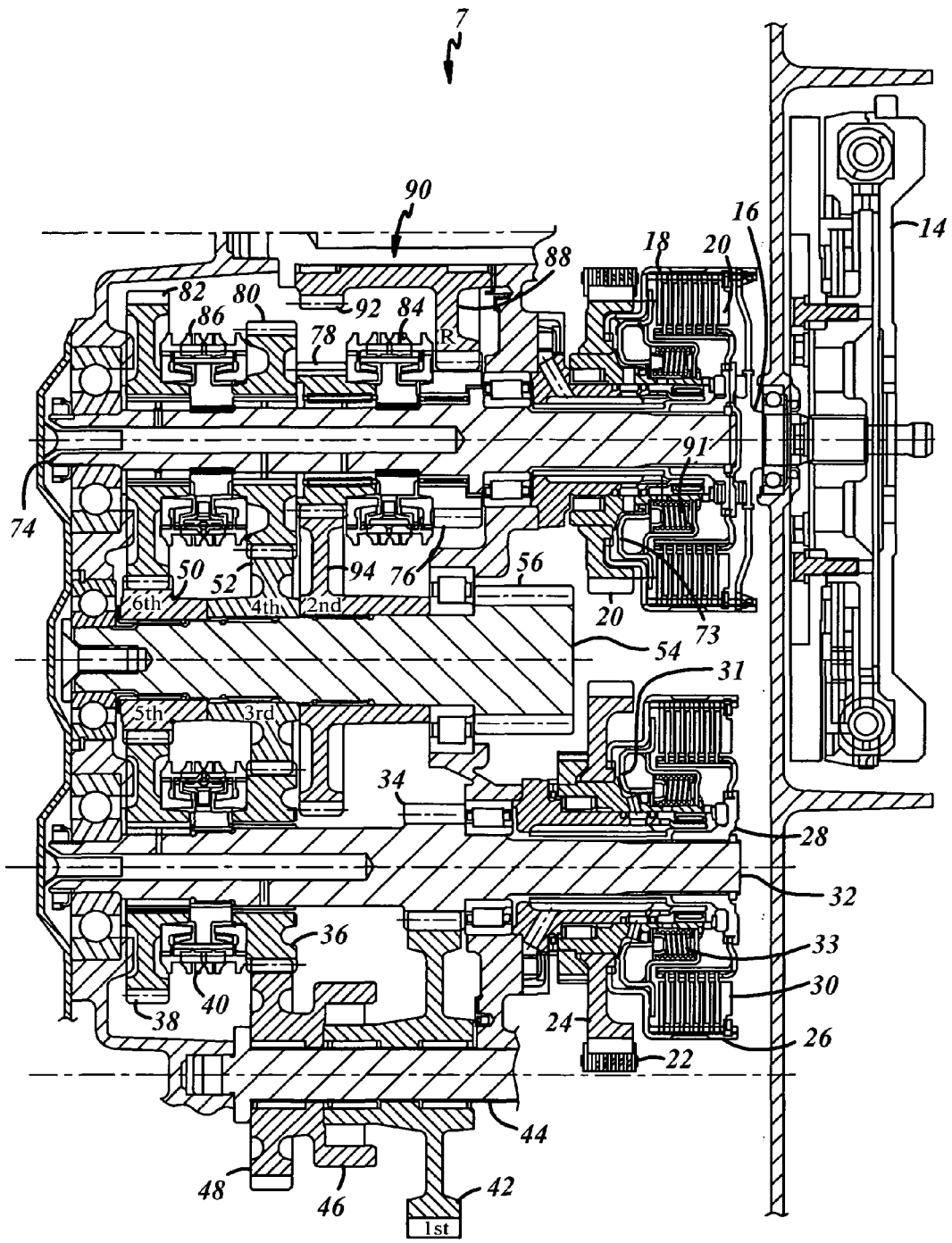
FIG. 2 is a sectional view of the transmission shown in FIG. 1.
Figure 6:
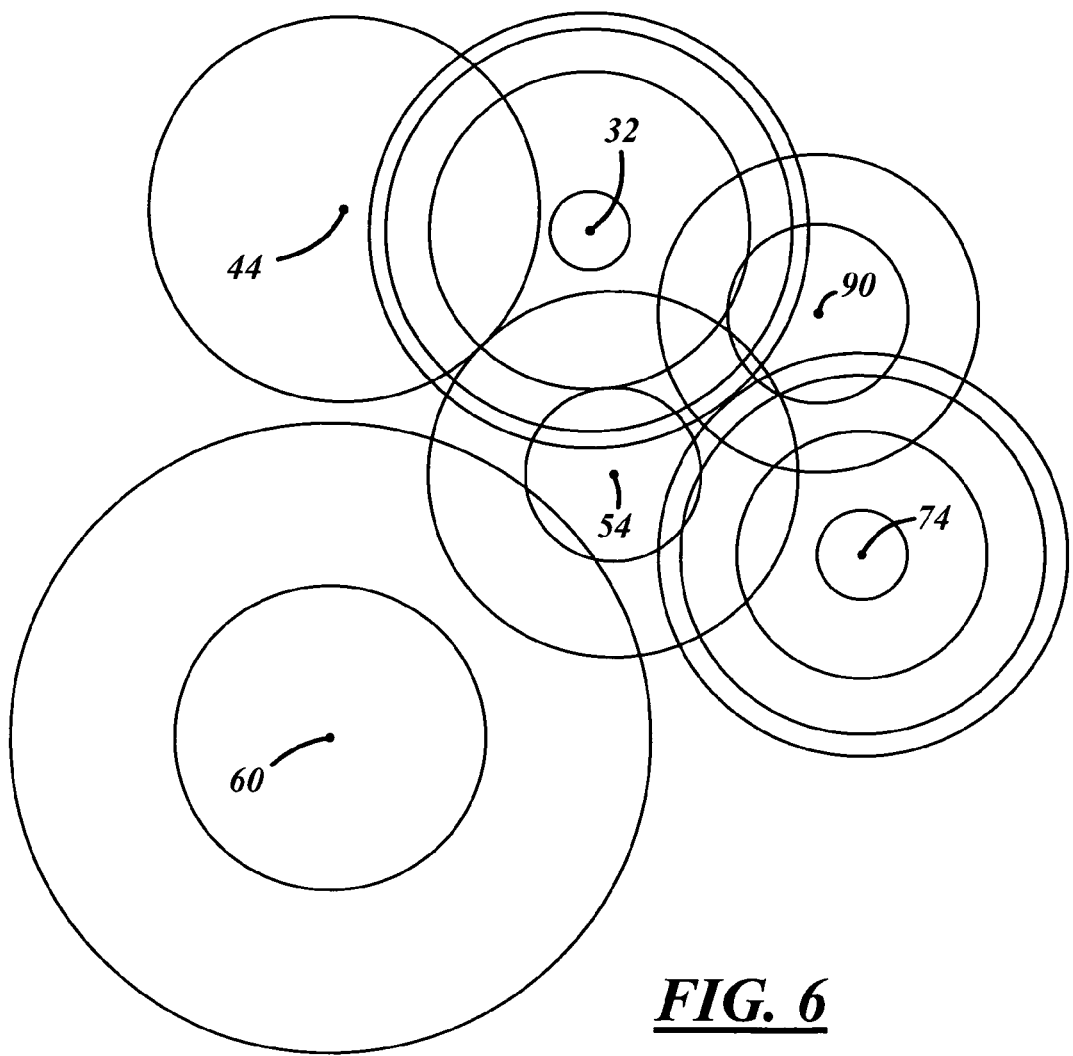
FIG. 6 is a schematic side view of illustration the relative position of the components of the transmission shown in FIGS. 1 and 2.

Referring to FIGS. 1, 2 and 6, a transverse mounted engine (not shown) of a front wheel drive vehicle powers a six speed dual clutch transmission 7 of the present invention. The engine typically will have a fly wheel connected with a damper 14. The damper is torsionally connected with a first clutch input shaft 16. The first clutch input shaft 16 is connected with a first clutch housing 18. The first clutch housing 18 is torsionally connected with a sprocket 20. The sprocket 20 is torsionally connected with a chain 22. The chain 22 is torsionally engaged with a second clutch housing sprocket 24. The second clutch housing sprocket 24 is fixably connected with a second clutch housing 26. The first clutch housing sprocket 20 has a diameter that is smaller than the diameter of the second housing sprocket 24; consequently, the first clutch housing 18 spins faster than the second clutch housing 26.

The second clutch housing 26 is selectively connected with a hub 28 via a friction pack 30. The housing 26 also has a gear that powers an output gear 29 powering an oil pump 37. A clutch actuator piston 31 is provided to engage the friction pack 30 with the hub 28. The hub 28 is torsionally connected with a second input shaft 32. The second input shaft 32 has torsionally affixed thereto, a first gear ratio input gear 34. The second input shaft 32 also has rotatably mounted thereon third gear ratio input gear 36 and fifth gear ratio input gear 38. To torsionally selectively connect the fifth input gear 38 or the third input gear 36 with the second input shaft 32, there is provided a fifth/third synchronizer 40.

The first input gear 34 is continually meshed with an idler gear input gear 42. The idler gear input gear 42 is rotatably mounted on an idler shaft 44. The idler shaft input gear 42 is torsionally connected via a one-way clutch 46 with a idler shaft output gear 48. The idler shaft output gear 48 is in continual mesh with the third input gear 36.

Fifth input gear 38 is in mesh with a fifth output gear 50. Third input gear 36 is meshed with a third output gear 52. Output gears 50 and 52 are torsionally affixed to an output shaft 54. Output shaft 54 also has torsionally affixed thereto a final drive pinion 56. Final drive pinion 56 is meshed with a differential input gear 58. Differential input gear 58 is a ring gear which is connected with a differential housing 60 which in turn drives two axial shafts 64 and 66. In other embodiments, (not shown), the transmission can have dual output shafts similar to that shown in "DCT TRANSMISSION UTILIZING TWO AXIS CHAIN", U.S. Provisional Application No. 61/269,781, filed Jun. 29, 2009, to Pritchard et al.

The first clutch housing 18 via a friction pack 70 is selectively torsionally engaged with a hub 72 which is splined to a first input shaft 74. The first input shaft 74 rotatably mounts a reverse drive input gear 76, a second gear ratio input gear 78, a fourth gear ratio input gear 80 and a sixth gear ratio input gear 82. The reverse drive or input gear 76 is in a bisecting coaxial plane of the final drive pinion 56. To torsionally affix the reverse input gear 76 or the second input gear 78 with the first input shaft 74, there is provided a second/reverse synchronizer actuator 84. To torsionally connect the sixth input gear 82 or the fourth gear ratio input gear 80 with the first input shaft 74, there is provided a sixth fourth synchronizer 86. The reverse input gear 76 is continually meshed with a reverse idler shaft input gear 88 which is in turn torsionally connected via reverse idler shaft 90 with a reverse idler shaft output gear 92 which meshes with a second output gear 94. Gear 50 also serves as an output gear for sixth input gear 82. Gear 52 also functions as an output gear for the fourth input gear 80.

In operation transmission 7 is powered by the damper 14 which is connected to the output shaft of an engine (not shown). The damper 14 dampens torsional vibrations provided by the reciprocating piston nature of the engine. The damper 14 rotates the clutch input shaft 16 and thus the clutch housing 18 and sprocket 20. The sprocket 20 drives chain 22 that drives the larger sprocket 24 associated with the second clutch housing 26. The second friction pack 30 is engaged by clutch piston 31 therefore, torsionally connecting the second clutch housing 26 with the hub 28 and the second input shaft 32. The first gear 34 powers the idler shaft input gear 42 which in turn via one-way clutch 46 torsionally turns idler shaft output gear 48. Rotation of output gear 48 causes rotation of the third input gear 36 and subsequent rotation of the third output gear 52. Rotation of third output gear 52 causes rotation of the output shaft 54 and the final drive pinion 56 thereby torsionally turning differential input ring gear 58 and thereby rotating the differential shafts 66 and 64. While the above is happening, according to the parameters of an electronic controller (not shown), the friction pack 70 is disengaged by depressurizing piston 73 and the force of biasing spring 91 and the synchronizer 84 is actuated leftward as shown in FIG. 1 to torsionally connect the second gear 78 with the first input shaft 74. When the controller signals for the transmission to engage in second gear, the friction pack 30 is released by depressurizing piston 31 and the force of biasing spring 33 and the friction pack 70 is engaged by piston 73. The transmission 7 is now in second gear. The above noted sequence of operation is commonly referred to a pre-selecting sequence. In a non-pre-selecting sequence, the synchronizer 84 does not connect the second gear 78 to the first output shaft 74 until friction pack 30 is released. Although the remainder of the operation of transmission 7 as described in a pre-selecting mode, it is apparent to those skilled in the art, that a combination of both pre-selecting and non-pre-selecting modes can be utilized. After the shift to complete to second gear, to prepare for the shift to third gear, synchronizer 84 is brought to a neutral position allowing the second gear 78 to be torsionally disengaged from the first input shaft 74. Simultaneously, fifth/third synchronizer 40 is moved rightward engaging third gear 36 with the second input shaft 32. This movement is primarily completed while the friction pack 30 is disengaged. Upon re-engagement of the friction pack 30, to connect the hub 28 with the clutch housing 26, the rotation of the second input shaft 32 moves the third gear 36. Third gear 36 now has torsional force transferring meshed contact with output gear 52 which in turn causes final drive pinion 56 to rotate the differential input gear 58. While in third gear, idler shaft output gear 48 is spun about faster than the differential input gear 42 is spun by the first input gear 34. Accordingly, the one-way clutch 46 allows a continual slippage and does not cause the combination of the third gear 36 first, gear 34 idler shaft output gear 48, and idler 42 shaft input gear 42 and idle shaft input gear 48 to lock up.

To shift to fourth gear, the fifth/third synchronizer 40 is moved leftward to disengage the third gear 36, simultaneously the friction pack 70 is engaged and synchronizer 86 engages the fourth gear 80 with the first input shaft 74. To switch to the fifth gear 38, friction pack 70 is disengaged. The fifth gear 38 previously engaged by synchronizer 40 meshes with output gear 50 and accordingly, turns the differential input ring gear 58. For a switch to the sixth gear, synchronizer 86 is moved leftward engaging gear 82 with the first input shaft 74 while the friction pack 70 is disengaged. Synchronizer 40 is moved rightward disengaging the fifth gear 38 from the second input shaft 32. After engagement with the shaft 74 and upon engagement of the friction pack 70, sixth gear 82 has torsional force transferring meshed contact with gear 50. Gear 50 causes the output shaft 54 to be rotated thereby rotating final drive output pinion 56 and input gear 58 of the differential 50.

Figure 3:
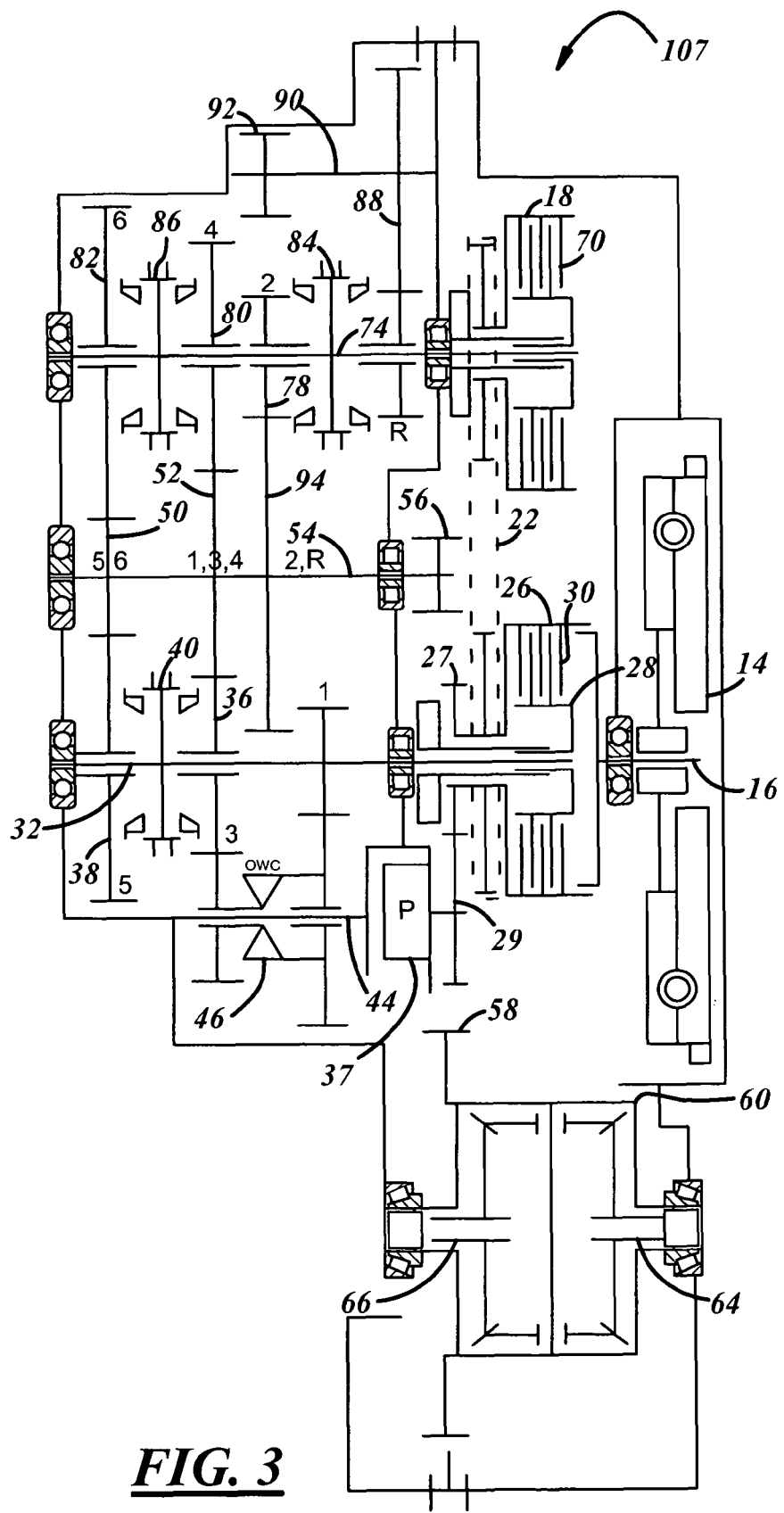
FIG. 3 is a schematic view of an alternative preferred embodiment dual clutch transmission according to the present invention.

Referring to FIG. 3, a dual clutch transmission according to the present invention is provided. Transmission 107 in its structure and operation is almost identical to transmission 7 with the exception in that the input shaft 16 of the clutch of transmission has an axis coterminous with the input axis of the second input shaft 32 instead of the first input shaft 74 as shown in the prior transmission 7. Although the structure and operation are virtually identical, there may be slight changes in some of the gear ratios for packing considerations.

Figure 4:
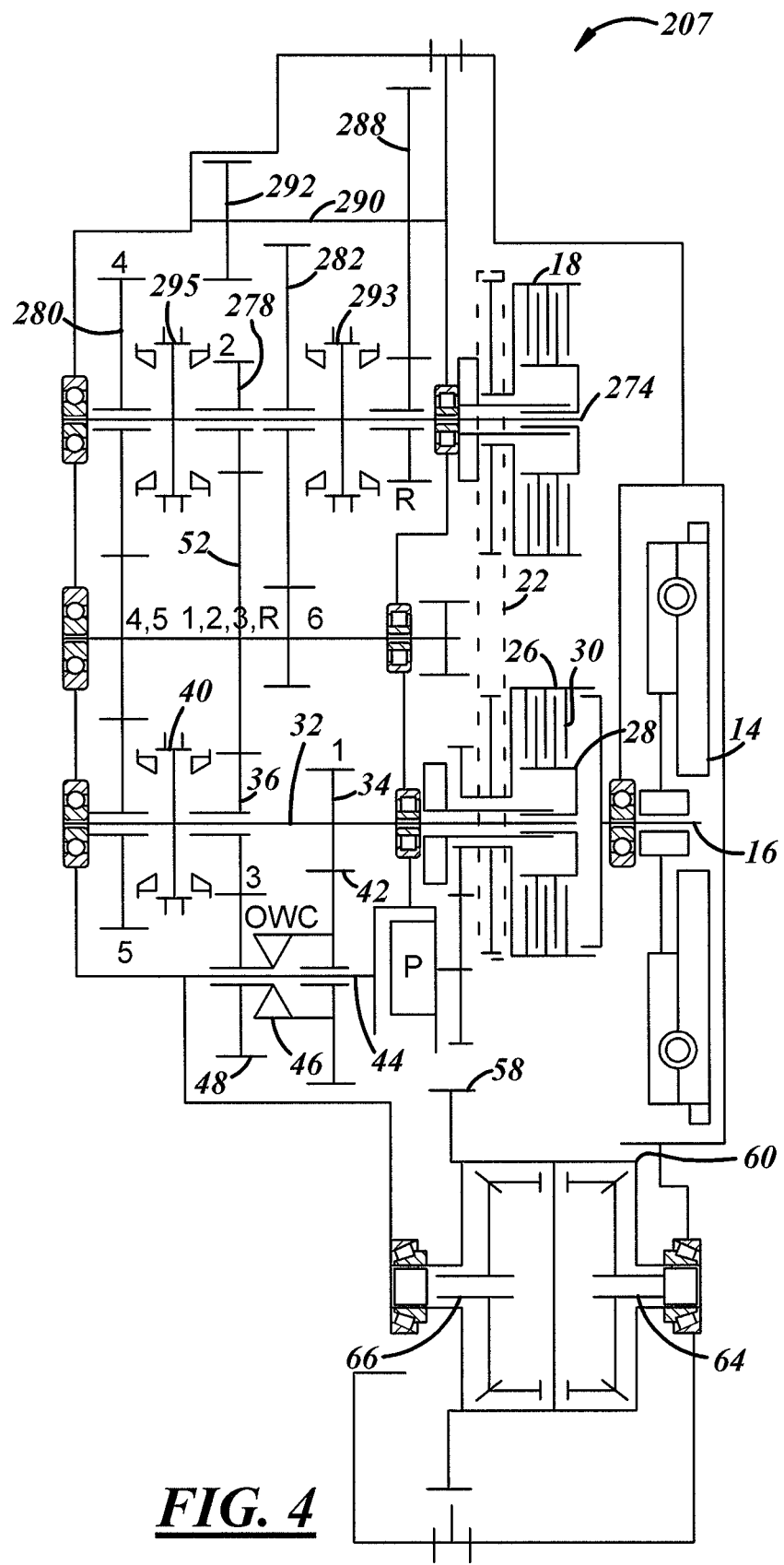
FIG. 4 is a schematic view of another alternate preferred embodiment dual clutch transmission according to the present invention.

Referring to FIG. 4, an alternate preferred embodiment transmission according to the present invention with identical or similar items which perform similar functions being given the same reference numeral. In the embodiment of the transmission 207, the locations of the even numbered forward gears are switched with the sixth gear ratio 282 being most adjacent to the clutch housing 18 and fourth gear 280 being furthest away from clutch housing 218. Fourth/second synchronizer 295 and sixth/reverse synchronizer 293 are provided on the first input shaft 274. Additionally, the second gear 278 is moved leftward as compared with the location of the second gear 78 in the embodiment 107 transmission. Another change of transmission 207 is that the reverse idler shaft 290 is extended as compared with the reverse idler shaft 90 in the 107 transmission. Output gear 52 now functions as the output gear for the first gear 34 and, third gear 36, second gear 278 and reverse idler shaft output gear 292.

Figure 5:
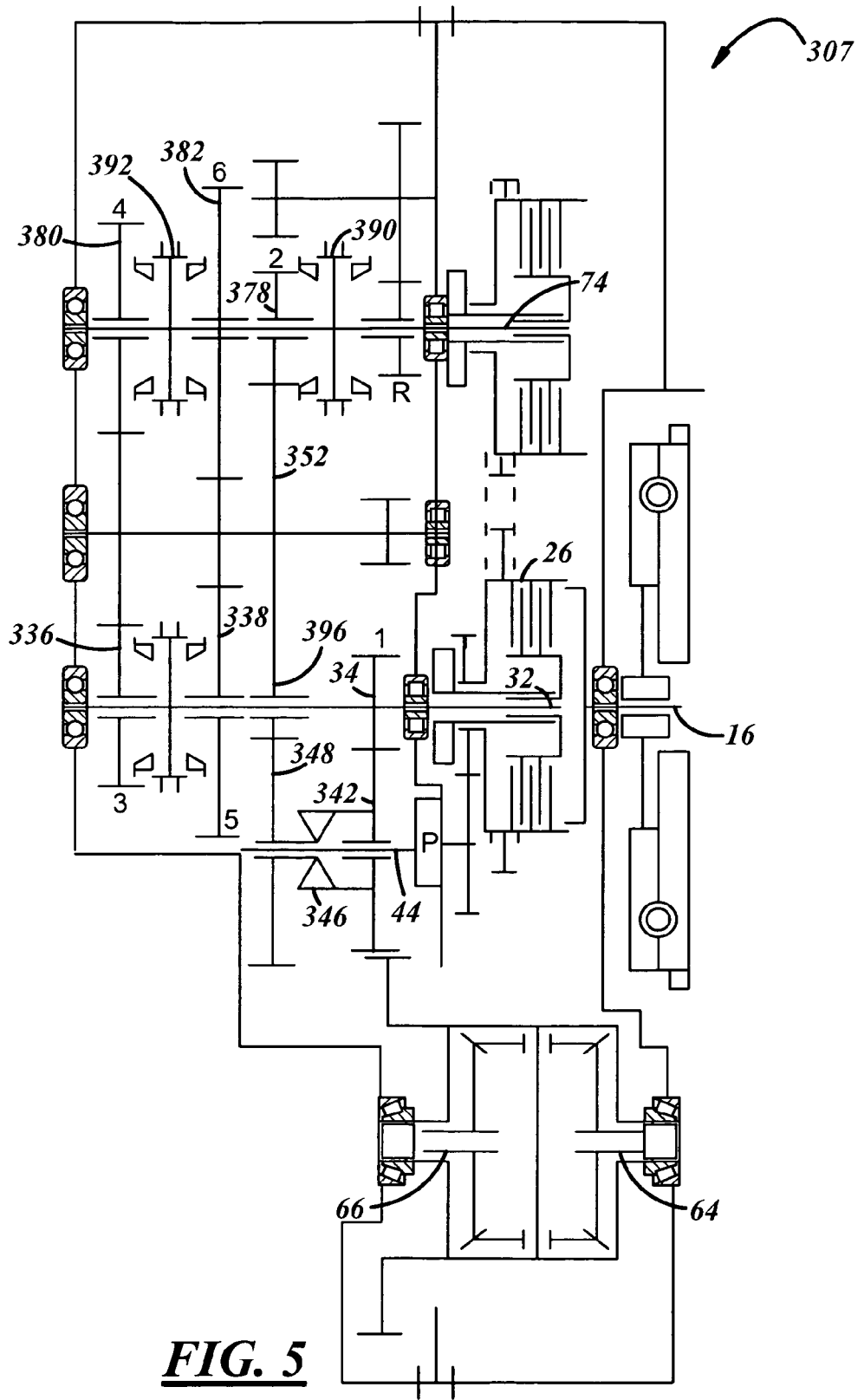
FIG. 5 is still yet another alternate preferred embodiment dual clutch transmission according to the present invention.

Referring to FIG. 5, an alternate embodiment transmission 307 of the present invention is shown. Transmission 307 varies from transmission 207 in that its third gear 336 is switched in position with its fifth gear 338. Additionally, second input gear 378 is switched with its relative position with sixth input gear 382. First gear 34 is continually meshed with idler input gear 342. Idler gear 342 has a smaller diameter than idler output gear 348. Idler output gear 348, which is connected to idler input gear 342 through a one-way clutch 346, is continually meshed with gear 396 which is rotatably mounted upon the second input shaft 32. Output gear 352 serves as a common output gear for the second input gear 378 and the first gear 34 via its idler input 342 and output gears 348.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A dual clutch transmission for a vehicle comprising:
   a first input shaft driven by a first clutch said first input shaft having second, fourth, sixth and reverse gear input gears mounted thereon, said first input shaft having a fourth and second gear synchronizer and a sixth and reverse gear synchronizer;
   a reverse idler shaft with reverse idler shaft input and reverse idler shaft output gears torsionally connected to one another;
   a second input shaft driven by a second clutch, said second input shaft having first, third and fifth input gears located thereon, said second input shaft having a fifth and third gear synchronizer;
   an output shaft driven by said first and second input shafts having selective meshed torsional force transferring gear contact therewith;
   a differential input gear driven by said output shaft;
   wherein said second input shaft has said first input gear that torsionally engages with a common output gear on said output shaft via an idler shaft having an idler shaft input gear torsionally connected on said idler shaft with an idler shaft output gear through a one way clutch and wherein said idler shaft output gear is meshed with said third input gear on said second input shaft; and
   wherein said common output gear has torsional force transferring contact with said third input gear and said second input gear and said reverse idler shaft output gear.

* * * * *